United States Patent [19]

McGann

[11] 4,132,065
[45] Jan. 2, 1979

[54] PRODUCTION OF $H_2$ AND CO-CONTAINING GAS STREAM AND POWER

[75] Inventor: Rodney McGann, Santa Cruz, Calif.

[73] Assignee: Texaco Inc., New York, N.Y.

[21] Appl. No.: 782,155

[22] Filed: Mar. 28, 1977

[51] Int. Cl.$^2$ ............................................. F02B 43/08
[52] U.S. Cl. .................................. 60/39.02; 60/39.12;
60/39.18 B; 48/215
[58] Field of Search ............. 60/39.02, 39.12, 39.18 B;
48/197 R, 215

[56] References Cited

U.S. PATENT DOCUMENTS

| | | | |
|---|---|---|---|
| 3,866,411 | 2/1975 | Marion et al. | 60/39.02 |
| 3,868,817 | 3/1975 | Marion et al. | 60/39.02 |

FOREIGN PATENT DOCUMENTS 952852  11/1956  Fed. Rep. of Germany ........... 60/39.12

*Primary Examiner*—Louis J. Casaregola

*Attorney, Agent, or Firm*—Thomas H. Whaley; Carl G. Ries; Bernard Marlowe

[57] ABSTRACT

A free-oxygen containing gas is heated while under pressure in a gas fired pressurized heater and then reacted with a hydrocarbonaceous fuel optionally in the presence of a temperature moderator in the reaction zone of a free-flow partial oxidation gas generator. The effluent gas stream from the gas generator is cooled, cleaned and optionally purified to produce a $H_2+CO$-containing product gas. One portion of said product gas is reacted in said pressurized heater with air in order to heat the free-oxygen containing gas going into the gas generator. Another portion of said product gas is burned with air in the combustor of a gas turbine. The exhaust gas from the combustor is passed through an expansion turbine to produce mechanical power for compressing the free-oxygen containing gas and air used in the system. The turbine may also drive a turbo-electric generator. At least a portion of the flue gas from the fired pressurized heater may be introduced into the combustor or into the expansion turbine.

32 Claims, 1 Drawing Figure

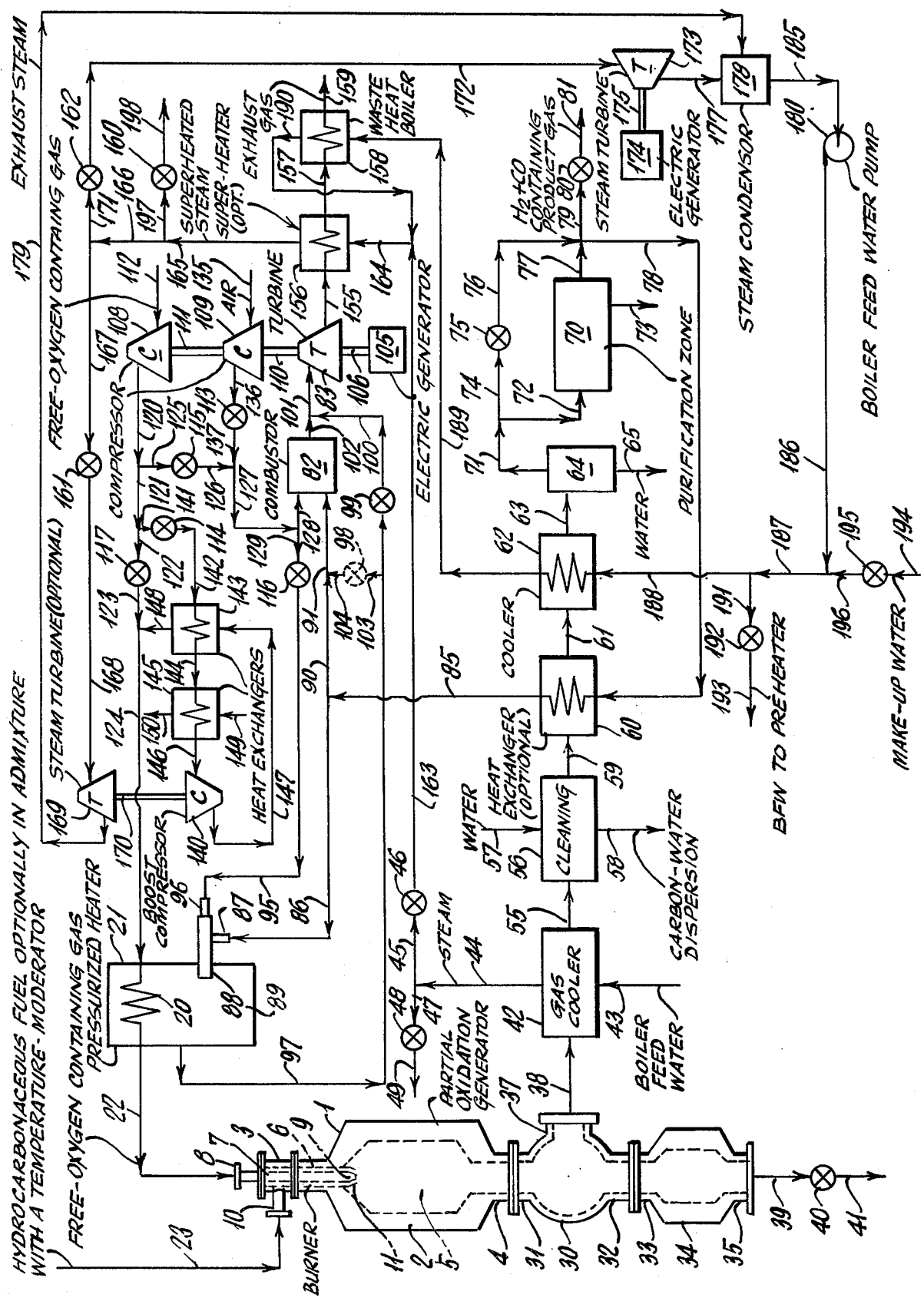

PRODUCTION OF H$_2$ AND CO-CONTAINING GAS STREAM AND POWER

BACKGROUND OF THE INVENTION

1. Field of the Invention

This invention pertains to the partial oxidation process. More specifically it pertains to the manufacture of a clean fuel gas for use in a power producing gas turbine.

2. Description of the Prior Art

In the conventional partial oxidation process, less than stoichiometric amounts of oxygen are reacted with a hydrocarbonaceous fuel optionally in the presence of a temperature moderator to produce a gaseous mixture comprising H$_2$+CO.

In coassigned U.S. Pat. No. 2,975,594 the liquid hydrocarbon feed to a precombustor contains substantial amounts of heavy metal compounds. By producing unreacted carbon in the amount of 0.5 to 10% of the carbon contained in the hydrocarbon and at least 50 times the combined weight of nickel and vanadium a carbon-ash composite is produced which may be separated. The resulting ash-free gas may be introduced into the combustor of a gas turbine. Air may be compressed by a compressor driven by said turbine, passed in heat exchanger with the exhaust gas from the turbine, and recycled to both combustors. In coassigned U.S. Pat. No. 3,868,817, turbine fuel gas is produced by partial oxidation in the presence of a temperature moderator selected from the group consisting of at least a portion of the CO$_2$-rich stream from the gas purification zone, at least a portion of the turbine exhaust gas, and mixtures thereof.

SUMMARY

Gaseous streams comprising H$_2$ and CO and at least one member of the group CO$_2$, H$_2$O, CH$_4$, H$_2$S, COS, N$_2$, A, and particulate carbon are made by the partial oxidation of a hydrocarbonaceous fuel with a stream of preheated free-oxygen containing gas i.e. air, oxygen-enriched air, and substantially pure oxygen, optionally in the presence of a temperature moderating gas in the reaction zone of a free-flow partial oxidation gas generator at a temperature in the range of about 1800° to 3000° F and a pressure in the range of about 10 to 200 atmospheres. The effluent gas stream from the gas generator is cooled, cleaned and if necessary purified to produce a clean product gas. Prior to being introduced into the gas generator, the free-oxygen containing gas is compressed and then heated in a gas fired pressurized heater by the total combustion or partial oxidation of a portion of said product gas with air. A second portion of said product gas is burned with air in the combustor of a gas turbine comprising said combustor and an expansion turbine. The flue gas from the fired pressurized heater, along with the exhaust gas leaving said combustor may be introduced into said power-developing expansion turbine as the working fluid. Alternatively, the flue gas from the pressurized heater may be mixed with at least a portion of the remaining product gas, and the mixture of gases is then introduced into said combustor as the fuel. Power for operating an electric generator and at least one compressor for compressing free-oxygen containing gas or air is obtained from said expansion turbine. An air or oxygen boost compressor may be driven by a steam turbine. Superheated steam for use as the working fluid in the steam turbine may be obtained by passing saturated stream in indirect heat exchange with the exhaust gas from said expansion turbine.

BRIEF DESCRIPTION OF THE DRAWING

The invention will be further understood by reference to the accompanying drawing which is a schematic representation of a preferred embodiment of the process.

DESCRIPTION OF THE INVENTION

This invention pertains to an improved continuous partial oxidation gasification process for producing synthesis gas, reducing gas, or fuel gas along with the production of mechanical power, and optionally electrical energy. The raw gas stream from the gas generator comprises H$_2$ and CO and at least one member of the group CO$_2$, H$_2$O, CH$_4$, H$_2$S, COS, N$_2$, A, and entrained particulate solids, i.e. carbon, and ash. The effluent gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No. 2,992,906 issued to F. E. Guptill, Jr.

A wide range of combustible carbon containing organic materials may be reacted in the gas generator with a free-oxygen containing gas optionally in the presence of a temperature moderating gas to produce said raw gas stream.

The term hydrocarbonaceous as used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous." For example, there are (1) pumpable slurries of solid carbonaceous fuels, such as coal, lignite, particulate carbon, petroleum coke, concentrated sewer sludge, and mixtures thereof in water or a liquid hydrocarbon; (2) gas-solid suspension such as finely ground solid carbonaceous fuels dispersed in either a temperature moderating gas or in a gaseous hydrocarbon; and (3) gas- liquid-solid dispersions, such as atomized liquid hydrocarbon fuel or water and particulate carbon dispersed in a temperature-moderating gas. The hydrocarbonaceous fuel may have a sulfur content in the range of 0 to 10 weight percent and an ash content in the range of about 0 to 50 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by products from chemical processes containing oxygenated hydrocarbonaceous organic materials and mixtures thereof.

The hydrocarbonaceous feed may be at room temperature of it may be preferably preheated to a temperature up to as high as about 600° F to 1200° F, say 800° F but preferably below its cracking temperature. The hydrocarbonaceous feed may be introduced into the burner in liquid phase or in a vaporized mixture with a temperature moderator. Suitable temperature moderators include steam, water, $CO_2$-rich gas, nitrogen in air, by-product nitrogen from a conventional air separation unit, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner. It may be at a temperature in the range of about ambient to 1200° F, say 300° to 600° F.

The weight ratio of total amount of $H_2O$ to fuel introduced into the reaction zone of the gas generator is the range of about 0 to 5.

When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or a combination thereof. In such case, the weight ratio of water to hydrocarbonaceous feed may be in the range of about 0.0 to 1.0 and preferably 0.0 to less than 0.2.

The term free-oxygen containing gas, as used herein is intended to include air, oxygen-enriched air, i.e. greater than 21 mole % oxygen, and substantially pure oxygen, i.e. greater than 95 mole % oxygen (the remainder comprising $N_2$ and rare gases). Free-oxygen containing gas may be introduced into the gas generator burner at a temperature in the range of about 400° to 1800° F. The free-oxygen containing gas is heated in a gas fired pressurized heater, to be further described, prior to being introduced into the burner in the gas generator. The ratio of free oxygen in the oxidant introduced into the gas generator to carbon in the feedstock (O/C, atom/atom) is preferably in the range of about 0.7 to 1.5.

The feedstreams may be introduced into the reaction zone of the gas generator by means of a fuel burner, such as the annulus-type burner in coassigned U.S. Pat. No. 2,928,460 issued to duBois Eastman et al. Any other suitable burner may be employed.

The feedstreams are reacted by partial oxidation in the reaction zone of the free-flow gas generator at an autogenous temperature in the range of about 1800° F to 3000° F, such as 2000 to 2900° F, and at a pressure in the range of about 10 to 200 atmospheres absolute, such as about 30 to 100 atm. abs. No catalyst is required. The reaction time in the gas generator is about 1 to 10 seconds. The raw effluent gas stream from the generator may have the following composition in mole %: $H_2$ 8.0 to 60.0, CO 8.0 to 70.0, $CO_2$ 1.0 to 50.0. $H_2O$ 2.0 to 50.0, $CH_4$ 0 to 30.0, $H_2S$ 0.0 to 1.0, COS 0.0 to 0.7, $N_2$ 0.0 to 80.0, and A 0.0 to 1.8. Unreacted particulate carbon (on the basis of carbon in the feed by weight) is usually present in the effluent gas stream in the amount of about 0.2 to 20 weight percent with liquid feeds, but is usually negligible with gaseous hydrocarbon feeds. Solid fuels such as coal may contain up to 50 wt. % ash. The specific composition of the effluent gas is dependent on actual operating conditions and feedstreams. Synthesis gas substantially comprises $H_2$+CO; all or most of the $H_2O$ and $CO_2$ are removed for reducing gas; and the $CH_4$ content is controlled for fuel gas, and depends on the desired heat of combustion.

A continuous stream of hot effluent gas, at substantially the same temperature and pressure as in the reaction zone leaves from the axial exit port of the gas generator and is then cooled, cleaned, dewatered and optionally purified. Optionally, for hydrocarbonaceous fuels containing a high ash content such as coal, a solids separation zone may be inserted between the exit port of the gas generator and a gas cooler.

The solids separation zone may comprise any suitable gravity or cyclone separator or other physical cleaning means for removing at least a portion of any solid matter that may be entrained in the hot effluent gas stream, or which may flow from the gas generator i.e. particulate carbon, ash, metal constituents, scale, slag, bits of refractory, and mixtures thereof. For example, a catchpot, slag chamber, cyclone separator, electrostatic precipitator, or combinations of such schemes may be used. The solid particles are separated from the effluent gas stream and recovered with very little, if any temperature or pressure drop in the process gas stream. Typical slag chambers that may be employed are shown in the attached drawing and in the drawing for coassigned U.S. Pat. No. 3,528,930.

Preferably, the process gas stream leaving the gas generator or the solids separation zone is cooled to a temperature in the range of about 200° to 1200° F, such as 400° to 600° F by indirect heat exchange with water in said gas cooler. Steam is simultaneously produced in the gas cooler having a temperature in the range of about 400° to 650° F. Optionally, this steam may be superheated to a temperature in the range of about 750° F to 1200° F by indirect heat exchange with turbine exhaust gas in a manner to be further described.

Alternately, the aforesaid solids separation zone and gas cooler may be replaced by direct quenching of the effluent gas stream from the gas generator in water in a quench tank such as shown in coassigned U.S. Pat. No. 2,896,927. As the process gas stream bubbles through water maintained at a temperature in the range of about 50° to 450° F substantially all of the particulate carbon and other entrained solids such as ash are scrubbed from the process gas stream and water is vaporized. A dispersion of water and solids e.g. particulate carbon, ash is removed from the bottom of the quench tank and separated by conventional liquid-solids separation processes e.g. settling, filtration, centrifuge, liquid hydrocarbon extraction. Clarified water may be returned to the quench tank.

In the preferred embodiment, after the effluent gas stream from the gas generator is cooled in a gas cooler it is introduced into a gas-liquid scrubbing zone where it is scrubbed with a scrubbing fluid such as liquid hydrocarbon or water in order to remove any entrained particulate carbon. A suitable liquid-gas tray-type column is more fully described in coassigned U.S. Pat. No. 3,916,382 — C. P. Marion. Thus, by passing the process gas stream up a scrubbing column in direct contact and countercurrent flow with a suitable scrubbing fluid or with dilute mixtures of particulate carbon and scrubbing fluid flowing down the column, the particulate carbon may be removed. A slurry of particulate carbon and scrubbing fluid is removed from the bottom of the column and sent to a carbon separation or concentration zone. This may be done by any conventional means that may be suitable e.g. filtration, centrifuge, gravity settling, or by liquid hydrocarbon extraction such as the process described in coassigned U.S. Pat. No. 2,992,906. Clean scrubbing fluid or dilute mixtures of scrubbing fluid and particulate carbon are recycled to the top of the column for scrubbing more gas.

Other suitable conventional gas cooling and cleaning procedures may be used in combination with or in place of the aforesaid scrubbing column. For example, the process gas stream may be introduced below the surface of a pool of quenching and scrubbing fluid by means of a dip-tube unit. Or the process gas stream may be passed through a plurality of scrubbing steps including an orifice-type scrubber or venturi nozzle scrubber such as shown in coassigned U.S. Pat. No. 3,618,296.

The clean process gas stream may be cooled below the dew point and dewatered by indirect heat exchange with at least a portion of the $H_2$+CO-containing product gas and with boiler feed water. The water condensed from the gas stream may be used elsewhere in the process, for example in the gas cleaning zone, or in the preparation of liquid-solid slurry feeds to the gas generator.

In another embodiment of the invention the fuel to the partial oxidation gas generator may contain sulfur compounds which appear in the effluent gas stream from the generator as $H_2S$ and COS. In such case it may be desirable to reduce the concentration of $H_2S$ and COS in the process gas to below the level of chemical attack on the turbine and gas compressors. To protect the environment, it may be desirable to reduce the concentration of $CO_2$, $H_2S$ and COS in the product gas or in the turbine exhaust gas which is vented to the atmosphere. The cooled cleaned, and dewatered process gas stream may be purified by removing acid-gases i.e. $H_2S$, COS, and $CO_2$ in an acid-gas absorption zone. Advantageously, this will permit reduction of the size and cost of the gas compressors. It will also upgrade the composition of the product gas stream, and prevent environmental pollution when the product gas is used as a fuel gas. Further, it will also prevent sulfur contamination of any downstream catalyst that the product gas may come in contact with.

Any suitable conventional process may be used to remove the gaseous impurities i.e. $H_2S$, COS, $CO_2$ in the gas purification zone. For example, refrigeration and physical or chemical absorption with solvents, such as methanol, n-methylpyrrolidone, triethanolamine, propylene carbonate, or alternately with hot potassium carbonate may be used. In solvent absorption processes, most of the $CO_2$ absorbed in the solvent may be released by simple flashing. The rest may be removed by stripping. This may be done most economically with nitrogen. Nitrogen may be available as a low cost by-product when a conventional air separation unit is used for producing substantially pure oxygen (95 mole percent $O_2$ or more) for use as the free-oxygen containing gas used in the gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly, the $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 353. Excess $SO_2$ may be removed and discarded in chemical combination with limestone, or by means of a suitable commercial extraction process.

A stream of dry, clean, and optionally purified process gas leaves from the gas cleaning purification zone at a temperature in the range of about 100° to 800° F and at a pressure in the range of about 10 to 180 atm. abs., such as 5 to 70 atm. abs. Advantageously, the pressure of this gas stream may be substantially the same as that in the gas generator less ordinary pressure drop in the lines and equipment. Expensive gas compressors are thereby avoided. The composition of this gas stream, which is also referred to herein as the $H_2$+CO-containing product gas may be as follows in mole % dry basis: $H_2$ 15 to 70, CO 20 to 75, $CH_4$ 0 to 30, $N_2$ 0.0 to 70 and A 0.0 to 2.0.

At least a portion i.e. about 50 to 100 volume percent (vol. %) such as about 70 to 80 vol. % of the $H_2$+CO containing product gas stream is used internally in the process as fuel gas. Separate portions of this fuel gas are introduced into a pressurized heater and also into the combustor of a gas turbine. The temperature of the fuel gas may be increased by indirect heat exchange with cleaned process gas. Any remaining $H_2$+CO-containing product gas stream that is not used internally may be exported for use as synthesis gas, reducing gas, or fuel gas. The actual internal-external division of the $H_2$+CO-containing product gas stream will depend on the purpose for which the system is designed. For example, if it is desired to produce mainly power for export starting with a dirty fuel and without contaminating the environment, then the cooled and cleaned generator gases are optionally cooled below the dew point to remove $H_2O$ and purified to remove acid gases i.e. $CO_2$, $H_2S$, and COS. All of the $H_2$+CO-containing product gas produced is preferably then used internally in the process as fuel gas. In such case, the clean dewatered and purified fuel gas that is produced in the process may have a heat of combustion in British Thermal Units per Standard Cubic Foot (BTU/SCF) in the range of about 70 to 350, such as 75 to 150, say 90.

As previously mentioned, a portion of the internally distributed $H_2$+CO-containing product gas stream is introduced into a pressurized heater as the fuel gas. The pressurized heater may be of any conventional type comprising a closed combustion chamber, equipped with a burner for introducing and mixing together compressed stream of fuel gas and air. An outlet is provided for discharging the flue gas under pressure. A pipe coil is disposed within the combustion chamber. A compressed stream of free-oxygen gas is passed through said pipe coil and heated to the proper temperature for introduction into the gas generator. Within the combustion chamber of the pressurized heater, the fuel gas is combusted or reacted with air which enters the heater at a temperature in the range of about 200° to 700° F. The pressure of the fuel gas and the air feed to the pressurized heater are preferably substantially the same as the pressure in the gas generator less ordinary pressure drop in the lines and equipment. Either complete combustion or partial oxidation of the fuel gas may take place in the pressurized heater depending on the atomic O/C ratio present. The amount of internally distributed $H_2+CO$ containing gas stream that is introduced into the pressurized heater is only a small percentage of the total amount of gas generated i.e. about 2 to 20 volume %. However, this amount of fuel gas is sufficient to heat all of the free-oxygen containing gas being introduced into the gas generator to a temperature in the range of about 400° to 1800° F, such as 900° to 1700° F, say 800° to 1200° F. When a portion of the free-oxygen containing gas is reacted in the pressurized heater it is preferable to take that portion from the main free-oxygen containing gas stream before said main stream is passed into the heater. In this way, the size of the heater may be decreased. In another embodiment, the entire main stream of free-oxygen containing gas may be passed through the heater. Then a portion of the heated free-oxygen containing gas leaving the heater may be split off and burned with the fuel gas in the heater.

At least a portion, and preferably all of the flue gas leaving the pressurized heater at a temperature in the range of about 1400 to 3000° F such as 1500 to 1700° F and a pressure in the range of about 5 to 70 atm. abs. such as about 10 to 20 atm. abs. is introduced into a gas turbine. The gas turbine comprises a combustor section, and a turbine section. The flue gas from the pressurized heater may be introduced into either section of the gas turbine. In the preferred embodiment, a portion of the $H_2+CO$-containing product gas is introduced into the pressurized heater and the remainder of the internally distributed portion is introduced into the combustor of said gas turbine where it is combusted with air. The air enters the combustor at a temperature in the range of about 200 to 700° F and at substantially the same pressure as the $H_2+CO$-containing gas feed to the combustor. Exhaust gas leaves the combustion chamber of the gas turbine at a temperature in the range of about 1400° F to 3000° F, such as 1500° F to 1700° F, and at a pressure in the range of about 5 to 70 atm. abs., say about 10 to 20 atm. abs. The exhaust gas stream from the combustion chamber of the gas turbine may be then mixed with at least a portion and preferably all of the flue gas stream from the previously described pressurized heater to produce a clean gas stream. When this gas stream is passed through at least one power-developing expansion turbine as the working fluid, more work may be obtained. When complete combustion takes place in the pressurized heater, the mixture of flue gas from the heater and exhaust gas from the combustor may have the following typical analysis in mole percent: $CO_2$ 4–20, $H_2O$ 4–20, $N_2$ 75–80, and $O_2$ 0–15. Only very small concentrations of oxides of nitrogen ($NO_x$) may be found in the flue gas. This is due to the comparatively low temperature in the combustion chamber, which is primarily the result of the comparatively low adiabatic flame temperature of the improved fuel gas. Further, the $SO_2$ content of the gas stream is nil; and entrained particulates are negligible.

Preferably, the flue gas stream from the pressurized heater is mixed with the exhaust gas from the combustor of the gas turbine prior to the introduction of the gas mixture to the turbine blades. Alternately, the flue gas stream from the pressurized heater and the exhaust gas stream from the combustor of the gas turbine may be introduced into the turbine blades as separate streams.

In another embodiment, at least a portion and preferably all of the flue gas from the pressurized heater along with air and that portion of the internally distributed $H_2+CO$-containing fuel gas stream which is not burned in the pressurized heater are introduced into the combustor of the gas turbine where combustion takes place. In such instance it may be advantageous to previously react the fuel gas in the combustion chamber of the pressurized heater by partial oxidation so that the flue gas may contain some $H_2$ and CO. The flue gas from the pressurized heater may enter the combustor preferably in admixture with the fuel gas. However, alternatively the flue gas may be introduced in admixture with the air. Coupled through a variable speed drive to the axis of the turbine and driven thereby may be at least one electric generator and at least one compressor. Air, prior to introduction into the gas turbine and into the pressurized heater, may be compressed by means of one of said compressors to the proper pressure e.g. over 10 to 180 atm. abs. Optionally, a free-oxygen containing gas, i.e. oxygen or oxygen-enriched air may be compressed by a separate compressor powered by said gas turbine to a pressure slightly above the pressure in the gas generator and then passed through said pressurized heater. If the free-oxygen containing gas which is fed to the gas generator is air, then one of the gas turbine driven compressors may be eliminated.

Recovery of the sensible heat in the clean exhaust gas which leaves the expansion turbine at a temperature in the range of about 800° F to 1200° F and a pressure in the range of about 1.0 to 7.0 atmospheres absolute may take place by heat exchange with saturated steam what was produced in a waste heat boiler or in a gas cooler located downstream from the gas generator. The clean exhaust gas may be then discharged into the atmosphere without causing pollution. Superheated steam may be produced thereby having a temperature in the range of about 750° F to 1200° F. The superheated steam may be used as the working fluid in at least one expansion turbine. The axial shaft of the steam turbine, for example, may be coupled through a variable drive to the shaft of a turbocompressor, to an electric generator, or to both. In one embodiment, the free-$O_2$ containing gas is partially compressed by the compressor powered by the gas turbine, cooled, further compressed by a steam turbine driven boost compressor, and then passed through the pressurized heater where it is heated.

The following benefits have resulted from the subject invention:

(1) A clean purified $H_2+CO$-containing product gas may be produced from low grade or undesirable fuels. (2) The product gas has an improved heating value and may be burned as fuel in a power producing gas turbine without polluting the atmosphere. (3) Smaller process equipment may be used throughout for the same residence time i.e. compressors, gasifier, gas cooler, assorted heat exchangers, and purification system. (4) Less combustion problems occur in the gas turbine combustor, primarily with combustor cooling methods.

DESCRIPTION OF THE DRAWING

A more complete understanding of the invention may be had by reference to the accompanying schematic drawing which shows an embodiment of the previously described process in detail. All of the lines and equipment are preferably insulated to minimize heat loss.

Referring to the figure in the drawing; free-flow partial oxidation gas generator 1 lined with refractory 2 as previously described has an upstream axially aligned flanged inlet port 3, a downstream axially aligned flanged outlet port 4, and an unpacked reaction zone 5. Annulus type burner 6, as previously described, with center passage 7 in alignment with the axis of gas generator 1 is mounted in inlet port 3. Center passage 7 has a flanged upstream inlet 8 and a converging conical shaped downstream nozzle 9 at the tip of the burner. Burner 6 is also provided with a concentric coaxial annular passage that has an upstream flanged inlet 10 and a downstream conical shaped discharge passage 11. Burners of other design may also be used.

A continuous stream of free-oxygen containing gas is heated by being passed through coil 20 in gas-fired pressurized heater 21, and is then passed through line 22 into flanged inlet 8 of burner 6. A hydrocarbonaceous fuel optionally in admixture with a temperature moderator such as $H_2O$, for example a slurry of coal and water, is introduced into burner 6 by way of line 23 and inlet 10.

Spherically shaped, refractory lined or insulated flanged "T" connector 30 is joined by inlet 31 to outlet 4 of gas generator 1. Axially-aligned outlet 32 is connected to inlet 33 of insulated slag pot 34. Flanged axial outlet 35 is normally closed by line 39 and valve 40.

The effluent gas stream from gas generator 1 passes through outlet 4. It then enters connector 30 through inlet 31 and leaves through outlet 37 and insulated line 38. Any particulate solids, such as slag, carbon, metals, or refractory that separates from the effluent gas stream in connector 30 accumulates in the bottom of slag pot 34. The material in slag pot 34 is periodically removed through line 39, valve 40, line 41 and through a conventional lock-hopper system not shown.

The effluent stream of generator gas is cooled in gas cooler 42 by indirect heat exchange with a coolant such as boiler feed water (BFW) from line 43. The BFW may be preheated elsewhere in the system. Steam is produced in gas cooler 42 and may leave for example as saturated steam through line 44, 45 and 46 for use elsewhere in the system. Optionally, at least a portion of the steam may be exported through line 47, valve 48, and line 49.

The cooled process gas stream in line 55 containing entrained particulate carbon and possibly other solids is passed into gas cleaning zone 56 where it is scrubbed with a scrubbing fluid such as water from line 57. particulate carbon and any other remaining solids is removed from the gas stream and leaves as a carbon-water dispersion in line 58. The clean process gas stream in line 59 is dewatered by being cooled below its dew point. Thus, the clean process gas stream is passed through heat exchanger 60, line 61 cooler 62, and line 63. Condensed water is removed in knock-out pot 64, and leaves through line 65. Optionally, any acid-gas impurities present may be removed in a conventional gas purification zone 70. In such case the cooled, cleaned, and dewatered process gas stream is passed through lines 71 and 72. Acid gases such as $CO_2$, $H_2S$, and COS may be removed and leave by line 73. By-pass line 74, valve 75, and line 76 are provided in the event no purification of the gas stream is necessary. The process gas stream in line 76 or the purified gas stream in line 72 comprises the $H_2$+CO-containing product gas. At least a portion of the $H_2$+CO-containing product gas in line 78 is used downstream in the process as fuel gas. The remainder of the product gas may be exported by way of line 79, valve 80, and line 81.

The $H_2$+CO-containing product gas in line 78 is burned as a fuel gas in pressurized heater 21 and in a gas turbine that comprises combustor 82 and expansion turbine 83. The stream of fuel gas in line 78 is optionally heated in heat exchanger 60, passed through line 85, and is then divided into two streams. One stream of fuel gas is passed into line 86 which leads into inlet 87 of burner 88 in the combustion chamber 89 of pressurized heater 21. The other stream of fuel gas is passed through lines 90, 91 and into combustor 82 of said gas turbine.

Air from line 95, is passed through inlet 96 of burner 88 in pressurized heater 21. Combustion takes place in heater 21, and the flue gas passes out through line 97. In the preferred embodiment with valve 98 closed and valve 99 open, the flue gas in line 92 is passed through line 100 and is mixed in line 101 with the exhaust gas leaving combustor 82 through line 102. The mixture of gases is then introduced, by way of line 101, into expansion turbine 83 as the working fluid. In another embodiment, with valve 98 open and valve 99 closed, the flue gas in line 97 is directed into combustor 82 of the gas turbine by being passed through line 103, valve 98, line 104, and into line 91 where it is mixed with the fuel gas from line 90. The mixture of gases is then introduced, by way of line 128, into combustor 82. After combustion the exhaust gas from combustor 82 is passed through lines 102 and 101 into expansion turbine 83 as the working fluid.

Optionally, expansion turbine 83 may be coupled to electric generator 105 by way of shaft 106. Free-oxygen containing gas compressor 108, and optionally air compressor 109 are driven by turbine 83, for example by shafts 110 and 111. When the free-oxygen containing gas is air, then compressor 109 may not be required. When the free-oxygen containing gas is substantially pure oxygen or oxygen enriched air, then both compressors 108 and 109 are included in the system.

For example, in the preferred embodiment, the free-oxygen containing gas is air in line 112. Air compressor 109 and boost compressor 140 may be cut out of the system by closing valves 113 and 114 and opening valves 115, 116, and 117. All of the air for the system is then compressed by compressor 108.

A first portion of compressed air is passed into the gas generator by way of lines 120 to 124, pressurized heater 21, coil 20, line 22, and inlet 8 of burner 6. A second portion of the air compressed in compressor 108 is passed into combustor 82 of the gas turbine by way of lines 120, and 125 to 128. A third portion of the air compressed in compressor 108 is passed into burner 88 in pressurized heater 21 by way of lines 120, 125, 126, 127, 129, 95, and inlet 96.

In another embodiment, the free-oxygen containing gas in line 112 is substantially pure oxygen which is compressed in compressor 108, heated in pressurized heater 21, and introduced into burner 6 of gas generator 1. Additional air compressor 109 is now included in the system. In such case, valve 115 is closed and valve 113 is opened. Air in line 135 is compressed in compressor 109 and a first-portion is passed through lines 136, 137, 127, and 128 into combustor 82. A second portion of air is directed into burner 88 of pressurized heater 21 by way of lines 136, 137, 127, 129, 95, and inlet 96.

In another embodiment, an air or free-oxygen containing gas boost compressor 140 may be used to increase the pressure of the compressed air or free-oxygen containing gas that was originally compressed by compressor 108. At least a portion of this compressed gas stream is finally introduced into gas generator 1 after being heated in pressurized heater 21. In such case, with valve 117 closed and valve 114 open, the free-oxygen containing gas in line 121 is passed through lines 141, 142, heat exchanger 143, line 144, heat exchanger 145, and line 146 into boost compressor 140. The compressed stream of free-oxygen containing gas is then passed through line 147, heat exchanger 143, lines 148 and 124, coil 20 of pressurized heater 21, line 22, and inlet 8 of burner 6. The free-oxygen containing gas passing through heat exchanger 145 is cooled by indirect heat exchange with water. For example, boiler feed water (BFW) in line 149 may be preheated in heat exchanger 145 and leaves by line 150. The preheated BFW may be introduced into gas cooler 42 by way of line 43 and converted into steam, in the manner previously described.

Optionally, in one embodiment the thermal efficiency of the process is increased by utilizing the sensible heat in the exhaust gas from expansion turbine 83 to superheat saturated steam produced in the system. The superheated steam is then used as the working fluid in at least one steam turbine for the production of mechanical work, electrical power or both. For example, the clean exhaust gas from turbine 83 is passed through line 155, superheater 156, line 157, waste heat boiler 158, and line 159 to the stack. With valves 48 and 160 closed and valves 46, 161, and 162 open, saturated steam may be passed through lines 163, 164, superheater 156, and lines 165 to 168 into steam turbine 169 as the working fluid. Steam turbine 169 is coupled to boost compressor 140, for example by way of shaft 170. Also superheated steam in line 166 may be optionally passed through lines 171 and 172 into steam turbine 173 as the working fluid. Steam turbine 173 may be coupled to electric generator 174 by shaft 175. Exhaust steam from steam turbine 173 is passed through line 177 into steam condensor 178. Similarly, exhaust steam from steam turbine 169 is passed through line 179 into steam condensor 178. Condensed water i.e. BFW may be pumped by pump 180 through lines 185 to 188, cooler 62, and line 189 into waste heat boiler 158. Saturated steam in line 190 may be passed through line 164 into superheater 156. Optionally, a portion of the BFW in line 187 may be passed through line 191, valve 192, and line 193 into line 149 where it is preheated in heat exchanger 145, in the manner previously described. Make-up water may be introduced into the system through line 194, valve 195, and line 196.

In the event that steam turbines 169, 173, or both are not in the system, then valves 161, 162, or both may be closed. Valve 160 may be then opened and superheated steam may be exported through lines 197 and 198.

In another embodiment, free-oxygen containing gas in line 124 may be preheated to a temperature in the range of about 800°–1100° F by indirect heat exchange with a portion of the exhaust gas from turbine 83 prior to being passed through pressurized heater 21.

The process of the invention has been described generally with reference to materials of particular compositions for purposes of clarity and illustration only. It will be apparent to those skilled in the art from the foregoing that various modifications of the process and materials disclosed herein can be made without departure from the spirit of the invention.

I claim:

1. A process for the production of an $H_2$ and CO-containing gas stream along with power comprising: (1) producing a raw process gas stream comprising $H_2$, and CO and at least one member of the group $CO_2$, $H_2O$, $H_2S$, COS, $CH_4$, $N_2$, A, and entrained particulate solids in the reaction zone of a free-flow gas generator by the partial oxidation of a hydrocarbonaceous fuel with a heated stream of free-oxygen containing gas and in the presence of a temperature moderator, at a temperature in the range of about 1800 to 3000° F and a pressure in the range of about 10 to 200 atmospheres; (2) removing entrained solids if any, cooling, cleaning, and dewatering, said $H_2$ and CO-containing gas stream; (3) dividing at least a portion of said $H_2$ and CO-containing gas stream from (2) into a first gas stream which is reacted in the combustion chamber of a pressurized heater as fuel producing a stream of flue gas, and into a second gas stream which is burned as fuel in the combustor of a gas turbine comprising said combustor and an expansion turbine thereby producing a stream of exhaust gas, and passing said stream of exhaust gas through said expansion turbine as the working fluid; and (4) compressing a stream of free-oxygen containing gas in gas compression means powered by said expansion turbine, heating at least a portion of the compressed free-oxygen containing gas in said pressurized heater, and introducing the heated compressed free-oxygen containing gas into the gas generator in step (1).

2. The process of claim 1 where in step (3) at least a portion of the flue gas from said pressurized heater is introduced into said expansion turbine in admixture with the exhaust gas stream from said combustor.

3. The process of claim 1 where in step (3) at least a portion of said flue gas is introduced into said combustor.

4. The process of claim 3 where in step (3) said flue gas is introduced into said combustor in admixture with said second gas stream.

5. The process of claim 1 wherein the free-oxygen containing gas in step (4) is compressed to a pressure in the range of about 10 to 200 atmospheres and slightly above that in the gas generator.

6. The process of claim 1 with the additional steps of passing the exhaust gas leaving said turbine in step (3) in indirect heat exchange with saturated steam to produce superheated steam; and introducing said superheated steam into a turboelectric generator as the working fluid.

7. The process of claim 1 with the additional steps of passing the exhaust gas leaving said turbine in step (3) in indirect heat exchange with saturated steam to produce superheated steam; and introducing said superheated steam into a turbocompressor as the working fluid for compressing to a higher pressure the stream of free-oxygen containing gas compressed in step (4).

8. The process of claim 1 provided with the added step of producing electrical energy by means of an electric generator powered by said expansion turbine.

9. The process of claim 1 wherein all of the flue gas from said pressurized heater in step (3) and all of said exhaust gas stream from step (3) are separately introduced into said expansion turbine.

10. The process of claim 1 where said reaction takes place in said pressurized heater at a pressure in the range of about 10 to 200 atmospheres.

11. The process of claim 1 wherein said portion of $H_2$ and CO-containing gas stream from (2) is introduced into said pressurized heater at substantially the same pressure as that in the gas generator less ordinary pressure drop in the lines and equipment.

12. The process of claim 1 wherein substantially all of the acid-gases are removed from the raw process gas stream from (1) in an absorption zone.

13. The process of claim 1 wherein the free-oxygen containing gas is selected from the group consisting of air, oxygen-enriched air (more than 21 mole % $O_2$) and substantially pure oxygen (more than 95 mole % $O_2$).

14. The process of claim 1 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

15. The process of claim 1 wherein said hydrocarbonaceous fuel is a gaseous hydrocarbon.

16. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

17. The process of claim 1 where in step (2) at least a portion of said entrained solids are separated in a slag pot and in a carbon separation zone and said solids are selected from the group consisting of particulate carbon, ash, slag, scale, refractory, metal constituents, and mixtures thereof.

18. The process of claim 1 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a vaporizable carrier such as water, liquid hydrocarbon and mixtures thereof.

19. The process of claim 1 wherein said free-oxygen containing gas in step (1) is compressed air which has been preheated in the pressurized heater in step (4) to a temperature in the range of about 400 to 1800° F.

20. The process of claim 19 provided with the step of introducing separate portions of said compressed air before being heated in said pressurized heater into the combustor of said gas turbine and into the combustion chamber of said pressurized heater.

21. The process of claim 19 provided with the steps of introducing a separate portion of said compressed air before being heated in said pressurized heater into the combustor of said gas turbine, and introducing a separate portion of said compressed air after being heated in said pressurized heater into said combustion chamber of said pressurized heater.

22. The process of claim 1 wherein said free-oxygen containing gas in step (1) is substantially pure oxygen and said oxygen is heated in the pressurized heater in step (4) to a temperature in the range of about 400 to 1800° F prior to introduction into said gas generator; and provided with the additional steps of compressing a stream of air in a separate compressor powered by said expansion turbine and introducing separate portions of said compressed air into the combustor of said gas turbine, and into the combustion chamber of said pressurized heater.

23. The process of claim 1 where in step (3) said first gas stream is reacted with air in the combustion chamber of said pressurized heater by partial oxidation.

24. A process for the production of an $H_2$ and CO-containing fuel gas stream along with power comprising: (1) producing a raw process gas stream comprising $H_2$ and CO and at least one member of the group $CO_2$, $H_2O$, $H_2S$, COS, $CH_4$, $N_2$, A, and entrained particulate solids in the reaction zone of a free-flow gas generator by the partial oxidation of a hydrocarbonaceous fuel with a heated stream of air and in the presence of a temperature moderator, at a temperature in the range of about 1800 to 3000° F and a pressure in the range of about 10 to 200 atmospheres; (2) removing entrained solids if any, cooling, cleaning, dewatering and purifying the raw process gas stream from (1) to produce said $H_2$ and CO-containing fuel gas stream; (3) dividing at least a portion of said $H_2$ and CO-containing gas stream from (2) into first and second fuel gas streams; (4) reacting said first fuel gas stream with air in a pressurized heater to produce heat and a stream of flue gas, and introducing said flue gas into a power-producing gas turbine comprising a combustor and an expansion turbine; (5) burning said second fuel gas stream with air in said combustor, producing a stream of clean exhaust gas, and introducing said exhaust gas through said expansion turbine as the working fluid; and (6) compressing a stream of air in a compressor powered by a portion of the power produced by said expansion turbine, heating a first portion of the compressed air in said pressurized heater in (4) and introducing the heated compressed air into the gas generator in (1) as said air, and introducing a second portion of said compressed air into the pressurized heater in (4) as said air, and introducing a third portion of said compressed air into the combustor in (5) as said air.

25. The process of claim 24 wherein at least a portion of the flue gas in step (4) is introduced into said expansion turbine in step (5) along with said clean exhaust gas from the combustor.

26. The process of claim 24 wherein at least a portion of the flue gas in step (4) is introduced into the combustor in step (5) along with said second fuel gas stream.

27. The process of claim 24 wherein the cooling in step (2) is effected by indirect heat exchange between the process gas stream from (1) and water thereby producing saturated steam, and provided with the additional steps of superheating said saturated steam by indirect heat exchange with clean exhaust gas from the turbine in step (5), introducing at least a portion of said superheated steam into a turbocompressor as the working fluid, and compressing to a greater pressure the compressed air in step (6) prior to introduction into said pressurized heater.

28. The process of claim 27 wherein a portion of said superheated steam is introduced into a turboelectric generator as the working fluid.

29. The process of claim 27 provided with the step of preheating the twice compressed air by indirect heat exchange with a portion of the turbine exhaust gas prior to introduction into said pressurized heater.

30. The process of claim 1 provided with the step of preheating said stream of compressed free-oxygen containing gas prior to introduction into said pressurized heater in step (4) by indirect heat exchange with a portion of the exhaust gas leaving said expansion turbine in step (3).

31. The process of claim 1 wherein said hydrocarbonaceous fuel is a gaseous hydrocarbon fuel and said partial oxidation reaction in step (1) takes place in the absence of a temperature moderator.

32. The process of claim 1 wherein the gas stream from step (2) is purified prior to step (3).

* * * * *